US009800768B2

(12) United States Patent
Bae et al.

(10) Patent No.: US 9,800,768 B2
(45) Date of Patent: Oct. 24, 2017

(54) ELECTRONIC DEVICE HAVING CAMERA MODULE PROTECTION STRUCTURE

(71) Applicant: Samsung Electronics Co., Ltd., Suwon-si (KR)

(72) Inventors: Seungjae Bae, Yongin-si (KR); Soonwoong Yang, Yongin-si (KR); Seungki Choi, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/837,996

(22) Filed: Aug. 27, 2015

(65) Prior Publication Data

US 2016/0065801 A1 Mar. 3, 2016

(30) Foreign Application Priority Data

Aug. 29, 2014 (KR) ........................ 10-2014-0114583

(51) Int. Cl.
*H04N 5/225* (2006.01)
*H04N 5/232* (2006.01)

(52) U.S. Cl.
CPC ....... *H04N 5/2257* (2013.01); *H04N 5/23258* (2013.01)

(58) Field of Classification Search
CPC .... H04N 5/225; H04N 5/2251; H04N 5/2252; H04N 5/2253; H04N 5/2254; H04N 5/2257; H04N 5/2259; H04N 5/23248; H04N 5/23251; H04N 5/23258; H04N 5/2328; H04N 5/23264; H04N 5/369; G03B 2217/007; G02B 27/646

USPC ......................................................... 348/374
See application file for complete search history.

(56) References Cited

U.S. PATENT DOCUMENTS

| 2007/0032951 | A1* | 2/2007 | Tanenhaus | G01C 21/16 |
| | | | | 702/151 |
| 2007/0103555 | A1* | 5/2007 | Eromaki | H04N 5/2254 |
| | | | | 348/208.4 |
| 2008/0152332 | A1 | 6/2008 | Koo | |
| 2010/0165131 | A1* | 7/2010 | Makimoto | G02B 27/646 |
| | | | | 348/208.7 |
| 2011/0150462 | A1* | 6/2011 | Chiu | G03B 3/10 |
| | | | | 396/542 |
| 2011/0304763 | A1* | 12/2011 | Choi | H04N 5/2253 |
| | | | | 348/340 |
| 2013/0093947 | A1* | 4/2013 | Lee | G03B 17/55 |
| | | | | 348/374 |
| 2013/0194442 | A1* | 8/2013 | Yazawa | H04N 5/23264 |
| | | | | 348/208.7 |

(Continued)

FOREIGN PATENT DOCUMENTS

| KR | 100385590 B1 | 5/2003 |
| KR | 100652815 B1 | 11/2006 |

(Continued)

*Primary Examiner* — Pritham Prabhakher
(74) *Attorney, Agent, or Firm* — McAndrews, Held & Malloy, Ltd.

(57) ABSTRACT

An electronic device having a camera module. The electronic device comprises: a Printed Circuit Board (PCB) located on a surface of the camera module; a lens module mounted on a first area of the PCB; fixing maintaining components mounted on a second area of the PCB; and a third area located between the first area and the second area, and having at least one opening.

12 Claims, 15 Drawing Sheets

(56) References Cited

U.S. PATENT DOCUMENTS

| | | | | |
|---|---|---|---|---|
| 2013/0222685 A1* | 8/2013 | Topliss | ................ | G02B 27/646 |
| | | | | 348/373 |
| 2013/0250170 A1* | 9/2013 | Oh | ........................ | G02B 7/08 |
| | | | | 348/374 |
| 2013/0258123 A1 | 10/2013 | Kim | | |
| 2014/0071304 A1* | 3/2014 | Kim | ................... | H04N 5/2253 |
| | | | | 348/208.99 |
| 2014/0139693 A1* | 5/2014 | Takei | ..................... | G03B 5/00 |
| | | | | 348/208.11 |
| 2014/0212127 A1* | 7/2014 | Chen | ................... | H04N 5/2258 |
| | | | | 396/542 |
| 2014/0255016 A1* | 9/2014 | Kim | ................... | G02B 27/646 |
| | | | | 396/55 |
| 2014/0285678 A1* | 9/2014 | Jeong | ................. | H04N 5/2257 |
| | | | | 348/208.7 |
| 2014/0371530 A1* | 12/2014 | Wieters | .............. | A61B 1/0011 |
| | | | | 600/109 |
| 2015/0145967 A1* | 5/2015 | Oh | ...................... | H04N 5/2251 |
| | | | | 348/47 |
| 2016/0047675 A1* | 2/2016 | Tanenhaus | ............ | G01C 21/16 |
| | | | | 702/104 |

FOREIGN PATENT DOCUMENTS

| | | |
|---|---|---|
| KR | 100772586 B1 | 10/2007 |
| KR | 100819301 B1 | 3/2008 |
| KR | 101184913 B1 | 9/2012 |
| KR | 101389375 B1 | 4/2014 |

* cited by examiner

ELECTRONIC DEVICE HAVING CAMERA MODULE PROTECTION STRUCTURE

CROSS-REFERENCE TO RELATED APPLICATION

This application claims the benefit under 35 U.S.C. §119 (a) of a Korean patent application filed on Aug. 29, 2014 in the Korean Intellectual Property Office and assigned Serial number 10-2014-0114583, the entire disclosure of which is hereby incorporated by reference.

TECHNICAL FIELD

Various embodiments of the present disclosure relates to an electronic device having a camera module protection structure.

BACKGROUND

In general, a camera module of a portable electronic device such as a high-end mobile communication terminal and a portable multimedia device has an image stabilization function as a next generation competition factor.

In the image stabilization function, technically, an Optical Image Stabilization (OIS) scheme moves a lens or a camera module in a direction perpendicular to an optical axis to modify a path of light so as to correct the quality of an image. Since the OIS scheme requires a mechanical driving device, a camera module using the OIS scheme may have a complex structure and expensive costs, regardless of the correction performance that the camera module may provide, as compared with other schemes such as an Electronic Image Stabilization (EIS) scheme, and a Digital Image Stabilization (DIS) scheme.

Further, the camera module may include surface-mount device (SMD) components on a circuit board. When the circuit board is bent, or when the SMD components changes in the Z axis direction, the performance of the OIS scheme deteriorates.

SUMMARY

An aspect of the present disclosure is to provide an electronic device in which a slit shape is applied to a Printed Circuit Board (PCB) of a camera module and a guide rib structure is added to a location corresponding to the slit shape as a camera module protection structure so that an eccentric problem generated during assembling is solved, an outer appearance is improved, and an external shock is prevented from being directly transferred to a lens module.

In accordance with an aspect of the present invention, an electronic device having a camera module, the electronic device comprises: a Printed Circuit Board (PCB) located on A surface of the camera module; a lens module mounted on a first area of the PCB; fixing maintaining components mounted on a second area of the PCB; and a third area located between the first area and the second area, and having at least one opening.

The PCB may be a rigid PCB.

The fixing maintaining components may be components having an OIS function, and comprise an angular velocity sensor and an electronic component located near the angular velocity sensor.

An opening formed in the third area between the first area and the second area may further comprise a slit.

The slit may have a first slit and a second slit formed on an upper side of the third area and a lower side of the third area, respectively. Alternatively, the slit may have only one silt formed on either the upper side of the third area or the lower side of the third area. Thus, at least one slit may be formed on at least one of the upper side and the lower side of the third area.

The electronic device may further comprise a Flexible PCB (FPCB) to assemble a connect part. A section area the FPCB may be connected to at least one of the first area and the second area of the PCB.

The electronic device may further comprise: a metal-made reinforcement plate formed on a rear surface of the PCB.

The metal-made reinforcement plate may include an upper side and a lower side, and may include a first slit on the upper side, and a second slit on the lower side. Alternatively, the metal-made reinforcement plate may include a slit formed on either the upper side or the lower side. Thus, at least one slit may be formed on at least one of the upper side and the lower side of the metal-made reinforcement plate The electronic device may further comprise a guide rib housing surrounding at least a peripheral part of the first area.

The guide rib housing may comprise a first guide rib surrounding three surfaces of the lens module and a second guide rib protruding to the slit formed on the PCB of the third area.

The guide rib may be in contact with a case cover and further comprises an elastic member located between the case cover and the lens module.

The second area may further comprise a shield can to cover at least a part of electronic component. The shield may also comprise an area that is maximally expanded.

The shield can may be pressed and fixed between a main PCB and the PCB.

The electronic device may further comprise an adhesive or an elastic member between the shield can and the main PCB.

BRIEF DESCRIPTION OF THE DRAWINGS

The above and other aspects, features, and advantages of certain embodiments the present disclosure will be more apparent from the following description taken in conjunction with the accompanying drawings, in which.

DETAILED DESCRIPTION

Figure 1:
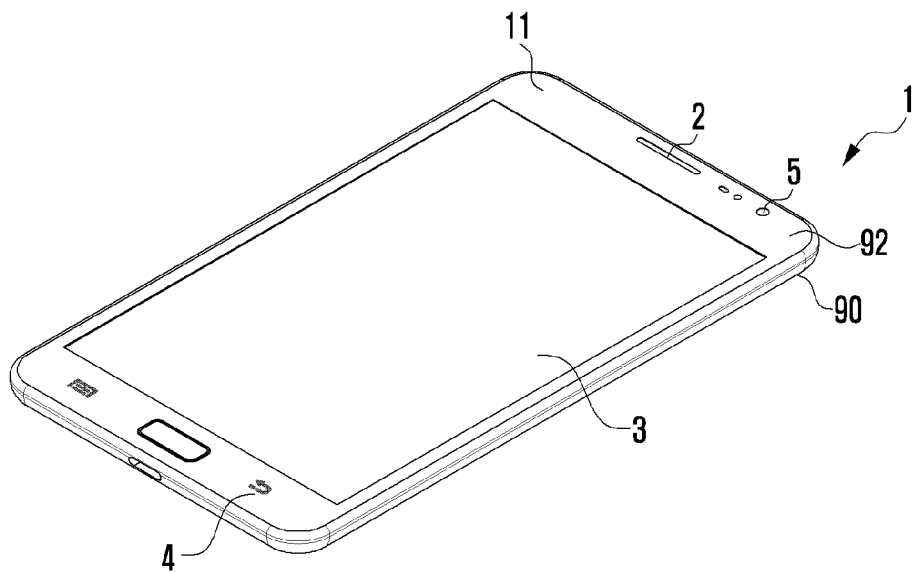
FIG. 1 is a front perspective view illustrating a portable terminal exemplified as an electronic device having a camera module protection structure according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those or ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used in embodiments of the present disclosure, the expression "include" or "may include" or "can include" refers to the existence of a corresponding function, operation, or constituent element, and does not limit one or more additional functions, operations, or constituent elements. Further, as used in embodiments of the present disclosure, the term, such as "include" or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

As used in embodiments of the present disclosure, the expression "and/or" includes any or all combinations of words enumerated together. For example, the expression "A or B" or "at least one of A and B" may include A, may include B, or may include both A and B.

While expressions including ordinal numbers, such as "first" and "second", as used in embodiments of the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

In various embodiments of the present disclosure, an electronic device may be a device that involves a communication function. For example, an electronic device may be a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group (MPEG-1 or MPEG-2) Audio Layer-3 (MP3) player, a portable medical device, a digital camera, or a wearable device (e.g., a Head-Mounted Device (HMD), such as electronic glasses, electronic clothes, an electronic bracelet, an electronic necklace, electronic tattoos, an electronic appcessory, a smart watch, and the like).

Further, a 3-dimensional X/Y/Z coordinate system is illustrated in the drawing of the present invention. A "Z axis" refers to an optical axis in which a lens barrel moves in a direction perpendicular to a lens module, an "X axis" refers to a horizontal direction of the lens module (direction perpendicular to the optical axis), and a "Y axis" refers to a vertical direction of the lens module (direction perpendicular to the optical axis and X axis).

Figure 2:
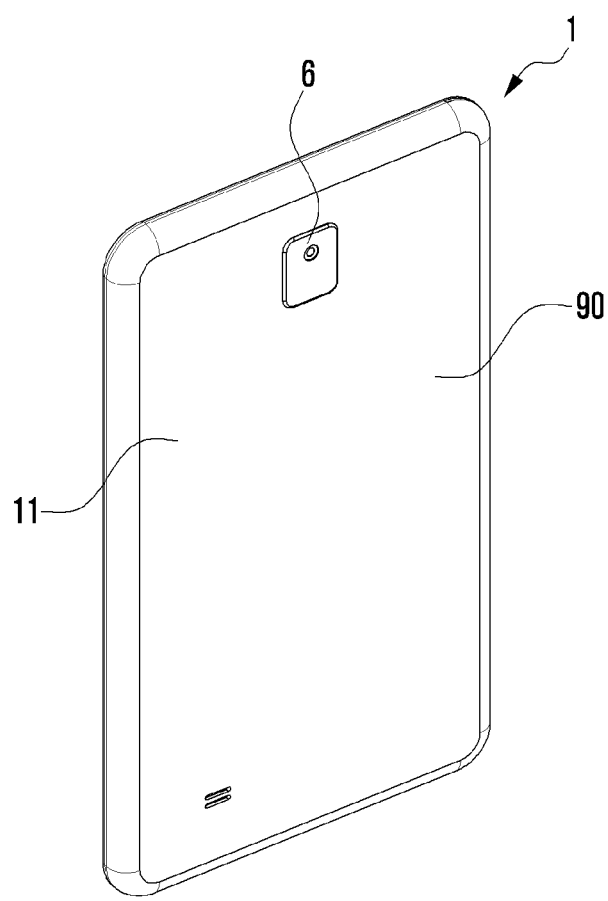
FIG. 2 is a rear perspective view of the portable terminal of FIG. 1.

FIGS. 1 and 2 illustrate the front surface and the rear surface of an exemplary electronic device in the form of a portable terminal 1 having a camera module protection structure according to various embodiments of the present disclosure, respectively.

Referring to FIGS. 1 and 2, the portable terminal 1 includes: a speaker apparatus 2 for outputting a sound; a touch screen apparatus 3 for displaying an image and receiving a touch input; a keypad apparatus 4 having a menu button (not shown), a home button (not shown), and a cancellation button (not shown) arranged therein; a front camera apparatus 5; and a rear camera apparatus 6.

Further, the portable terminal 1 has a housing 11 having an outer appearance. The housing 11 may include a plurality of components housed in a receiving space (not shown).

The housing 11 may further include a front housing 92, a rear housing (not illustrated), and a rear cover (or battery cover) 90.

The front housing 92 is coupled to the rear housing, the battery cover 90 covers the rear housing, the front housing 92 is disposed on a front surface of the portable terminal 1, and the battery cover 90 is disposed on a rear surface of the portable terminal 1.

The rear camera apparatus 6 may include an OIS-applied camera module 10.

Figure 3:
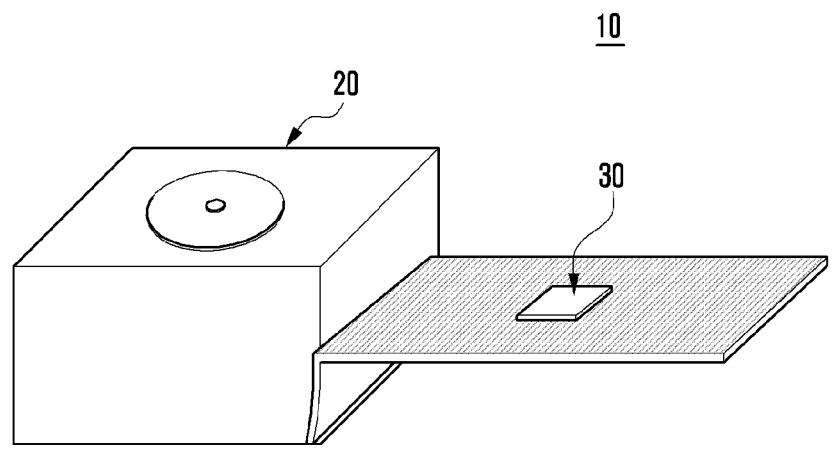
FIG. 3 is a schematic view illustrating a structure of an OIS-applied camera module of the portable terminal of FIG. 1.

As illustrated in FIG. 3, a gyro sensor in the form of an angular velocity sensor 30 may be equipped on the side surface of the OIS-applied camera module 10. In the embodiment shown, the angular velocity sensor 30 may be arranged in parallel to the lens module 20 axially.

Figure 4:
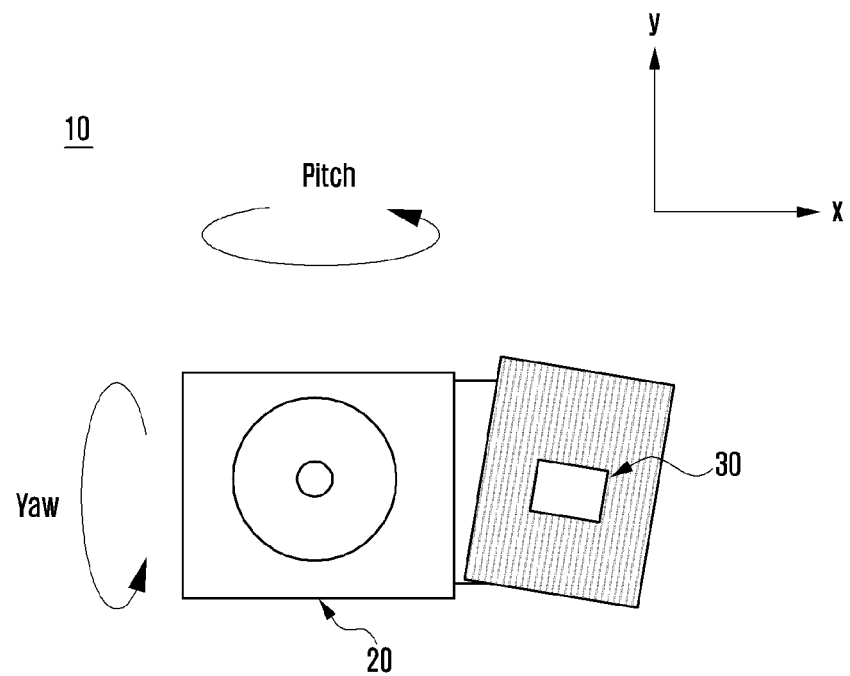
FIGS. 4 and 5 are schematic views for exemplifying performance deterioration according to the OIS structure of FIG. 3.
Figure 5:
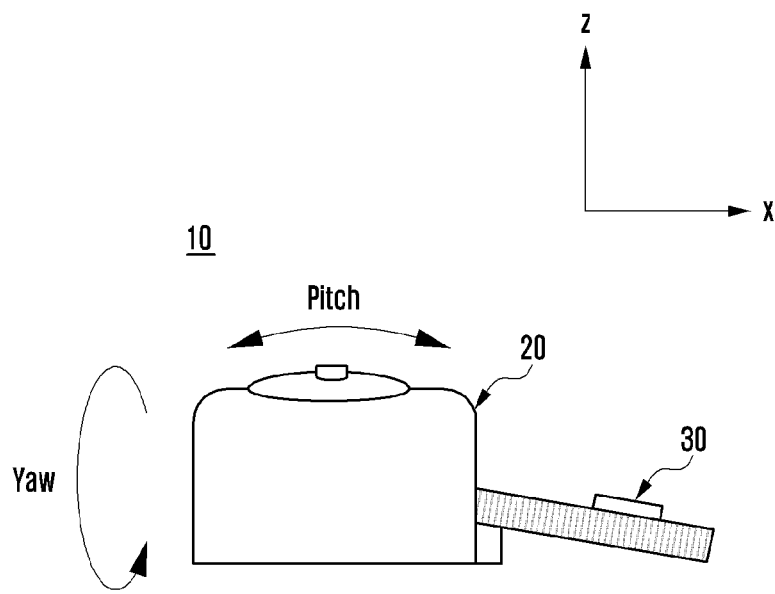

As illustrated in FIGS. 4 and 5, when the angular velocity sensor 30 is in contact with a side surface of the lens module 20, a location of the angular velocity sensor 30 may interfere with how the OIS scheme is applied at the lens module 20. For example, if the angular velocity sensor 30 may be twisted in an axial line, and at this time, the OIS performance may deteriorate.

Accordingly, when the lens module 20 is seated on a bracket (not shown) in a camera assembly (not shown), and when the lens module 20 is being applied to a Flexible Printed Circuit Board (FPCB), any deviation of components in the assembly, or the bracket, may cause deviation of the placement of the lens module 20. Further, it is also difficult for all components in the assembly, and the bracket to maintain an axial parallel state with respect to the lens module 20. As a result, OIS performance deteriorates.

Further, the lens module 20 is generally supported from three surfaces. Since a shock reinforcement structure for supporting the lens module 20 may be unable to absorb in all directions, the lens module 20 may easily be broken, or an eccentricity of the lens module 20 may occur in a direction where support may be weaker relative to support from other directions.

Figure 6:
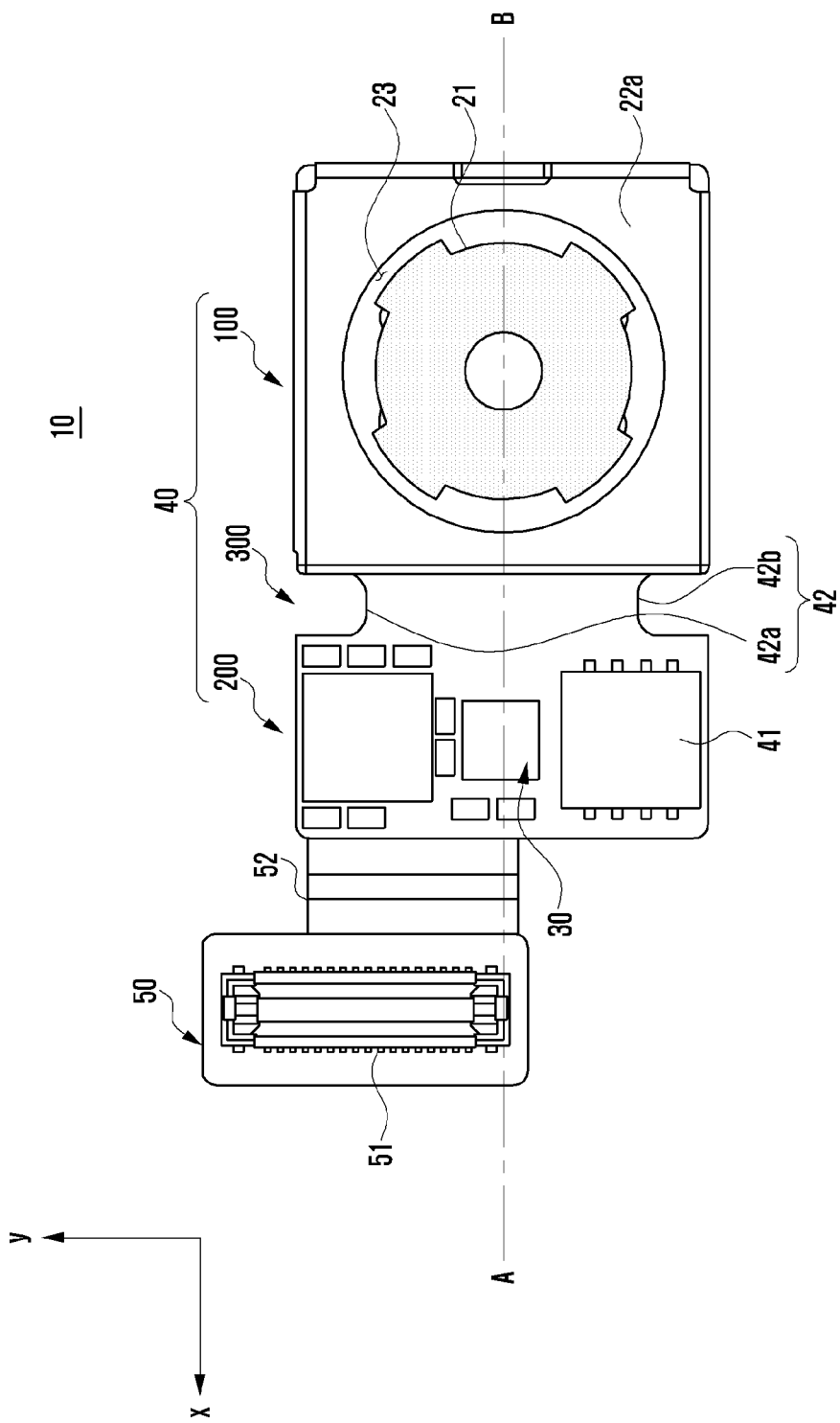
FIG. 6 is a plan view illustrating a configuration of an electronic device having a camera module protection structure according to an embodiment of the present disclosure.
Figure 7:
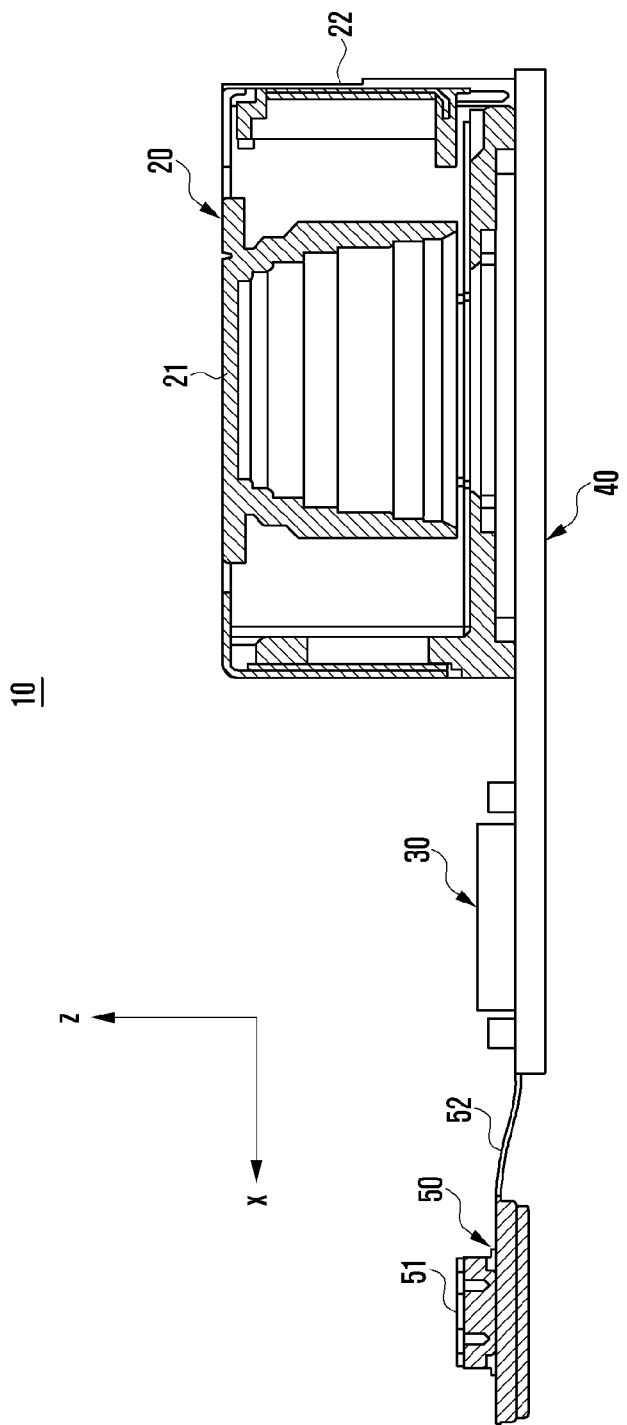
FIG. 7 is a sectional view taken along line A-B of FIG. 6.
Figure 8:
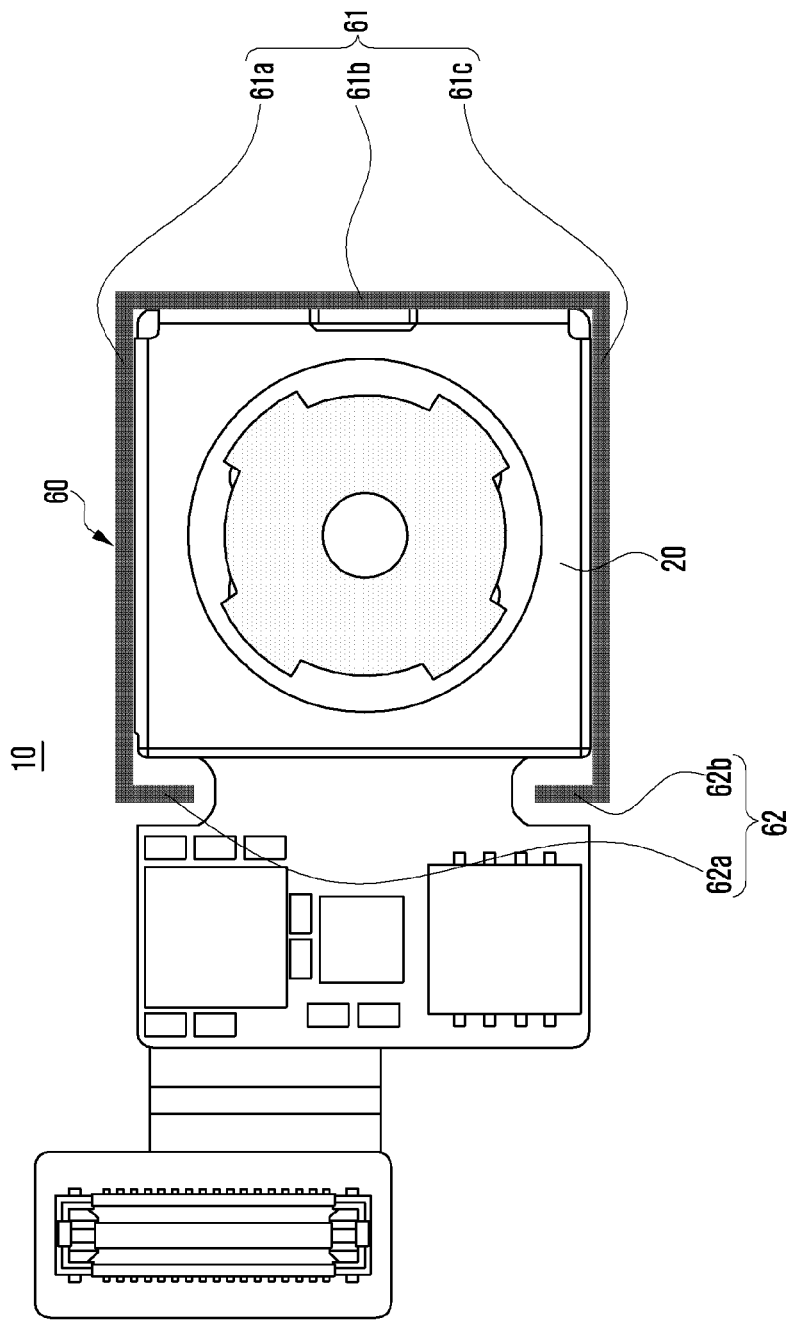
FIG. 8 is a plan view illustrating a camera module protection structure according to various embodiments of the present disclosure.

An electronic device having a camera module protection structure according to various embodiments of the present disclosure resolves the above-described problem, and FIGS. 6 through 8 illustrate a configuration of the electronic device having a camera module protection structure according to various embodiments of the present invention.

Referring to FIGS. 6 through 8, a camera module structure of an electronic device according to an embodiment of the present disclosure may employ a PCB 40 having thereon both the lens module 20 and the angular velocity sensor 30. Since both the lens module 20 and the angular velocity sensor 30 are integrally applied to the PCB 40, there is no deviation between the lens module 20 and the angular velocity sensor 30 axially with respect to Z axis.

Since there is no deviation with respect to the Z axis, when components having OIS functions are assembled, a fixing maintaining component may be employed for the components having the OIS functions and a rigid PCB 40 and/or a FPCB 52.

The rigid PCB 40 may include: a first area 100 as a lens module mounting area to which the lens module 20 is mounted; a second area 200 as a fixing maintaining component mounting area to which components such as electronic components 41 having the OIS are mounted; and a third area 300 between the first area 100 and the second area 200.

The lens module 20 may include: a lens housing having a lens hole 23 formed at the center of an upper surface 22a thereof; and a lens barrel 21 formed at the center of the lens housing 22 through the lens hole 23.

The third area 300 may form or include at least one opening, e.g., a slit 42, to have a minimal size.

The slit 42 may be applied as a U-shape which may partially include at least a straight section.

In the present embodiment, the slit 42 has a first slit 42a and a second slit 42b which are U-shaped. In the embodiment shown, the first slit 42a is applied to an upper side of the third area 300, whereas the second slit 42b is applied to a lower side of the third area 300. In other embodiments, however, the slit 42 may be applied to only one of the upper side and the lower side of the third area 300. The shape of the slit 42 may be an open curve, a part of which is open, or may be a closed curve, such as a circle or an ellipse, within the third area 300.

A section of the FPCB 52 may be connected to a side of the second area 200 of the PCB 40 in order to assemble a connector part 50 having a connector 51 formed therein.

As described above, the PCB 40 to which the slit 42 is applied may be vulnerable to deformation such as torsion as compared with the PCB to which the slit 42 is not applied.

Figure 9:
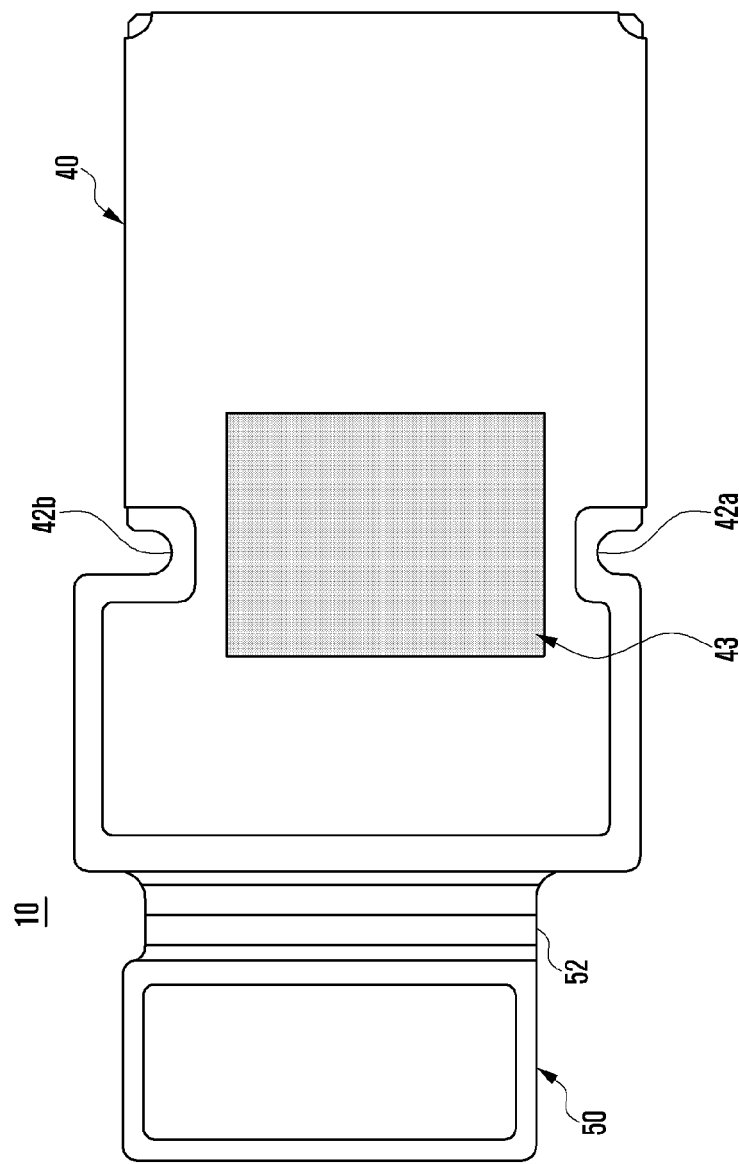
FIG. 9 is a rear view of FIG. 6.

Accordingly, as illustrated in FIG. 9, at least a part of each of the first area 100, the second area 200, and the third area 300 may include a reinforcement plate 43 in order to reinforce the weakened strength. In some embodiments, the reinforcement plate 43 may be made of metal, thus forming a metal-made reinforcement plate. For example, the reinforcement plate 43 may be made of a metal material such as a Steel Use Stainless (SUS) or aluminum, a high-strength composite material such as Glass Fiber Reinforced Polymer (GFRP) or Carbon Fiber Reinforced Polymer (CFRP), or a suitable material which has high strength and can reduce the deformation of the PCB 40.

Further, the reinforcement plate 43 may have a width wider than that of the slit 42 and may be located between the slits 42a and 42b applied to the upper side and the lower side of the third area 300.

As described above, in the camera module protection structure according to various embodiments of the present invention, the strength of camera module protection structure is weakened as the slit 42 is applied. With the reinforcement plate 43 form at the slit 42 between the lens module 20 and the angular velocity sensor 30, the PCB 40 may be prevented from being bent.

Figure 15:
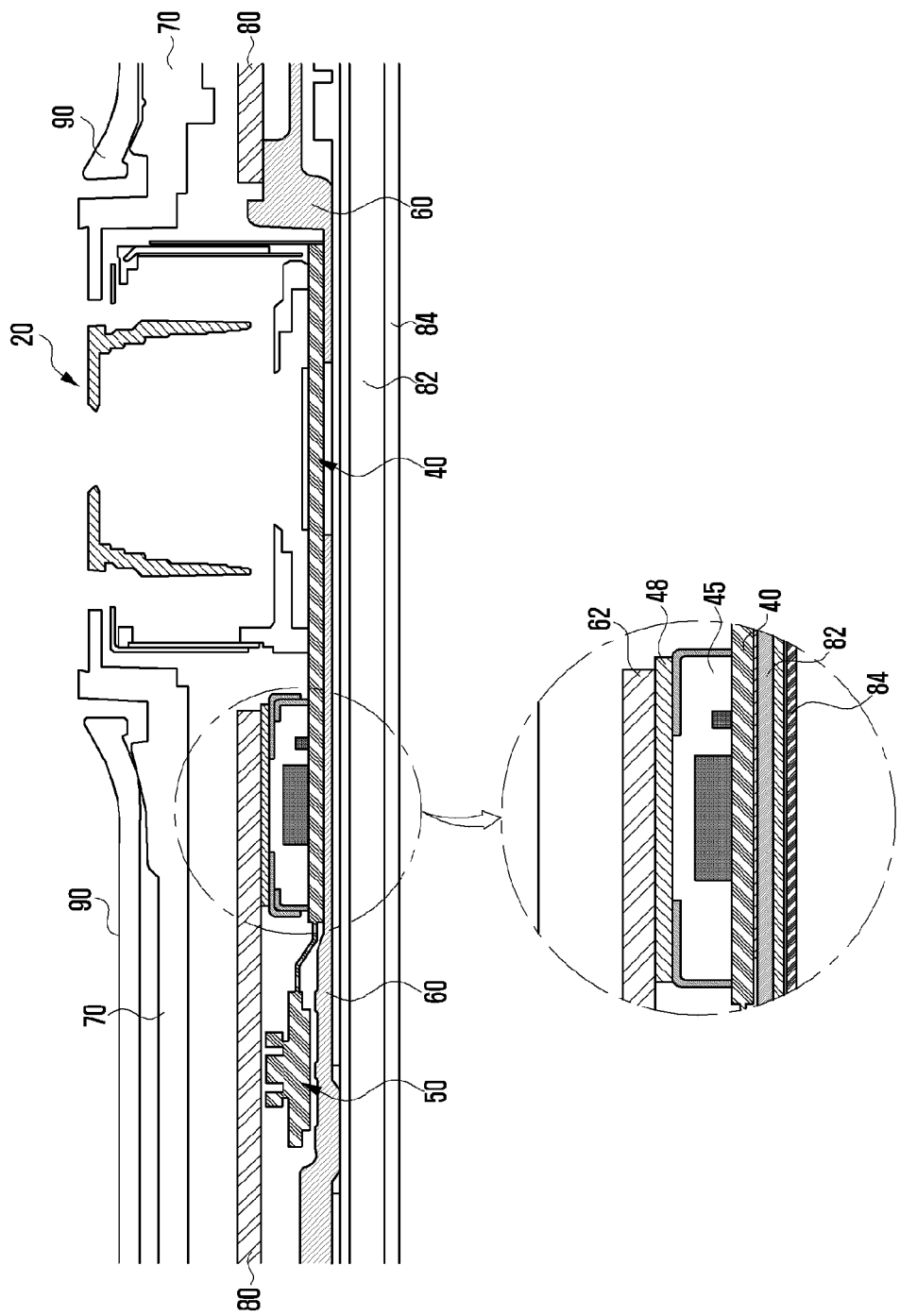
FIG. 15 is a sectional view schematically illustrating a part of a coupling portion of the portable terminal of FIG. 14.

Further, the strength reinforcement resulting from the application of the slit 42 can be achieved by maximally expanding an area of a shield can 45 (as shown in FIG. 15). In this way, the shield can 45 may cover at least a part of the electronic components 41 in the second area 200, which will be described below.

Figure 14:
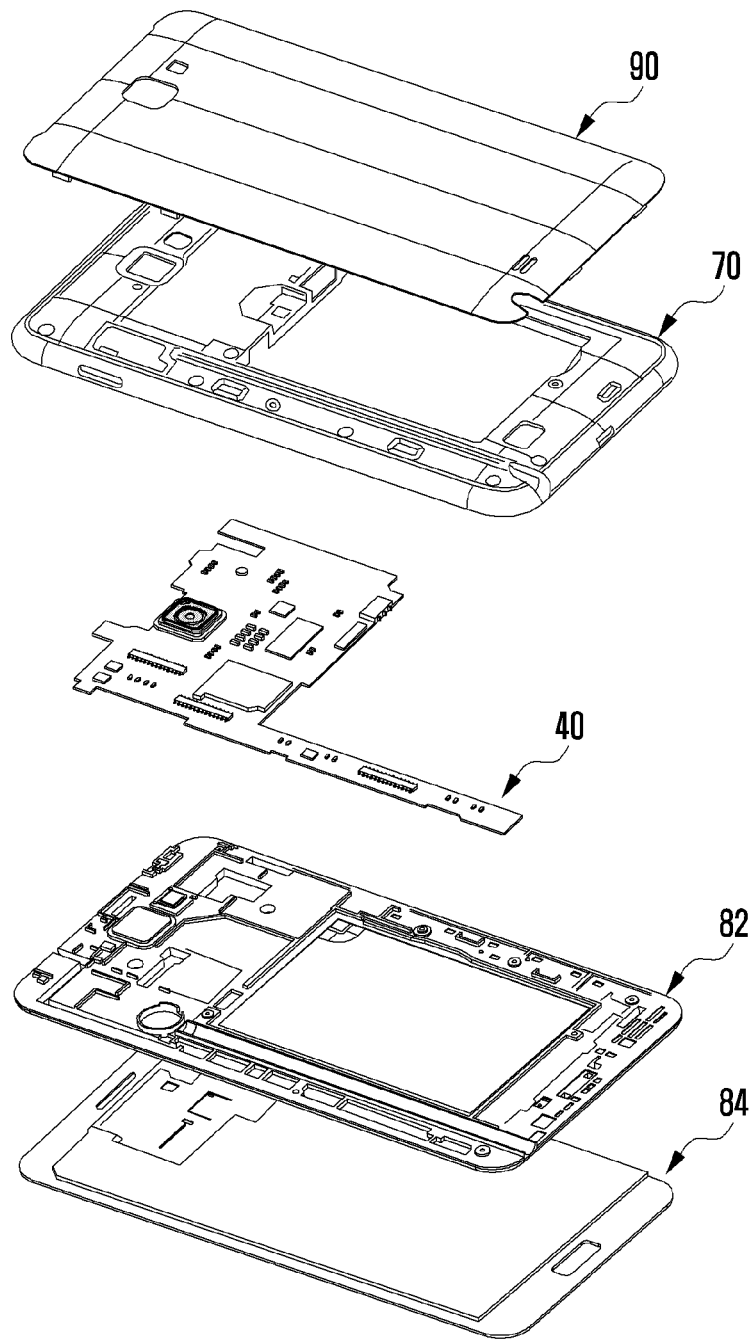
FIG. 14 is an exploded perspective view illustrating a portable terminal exemplified as an electronic device having a camera module protection structure according to various embodiments of the present disclosure.

FIG. 14 illustrates a portable terminal (similar to the portable terminal 1 of FIG. 1) as having a camera module protection structure according to various embodiments of the present disclosure. FIG. 15 schematically illustrates a part of a coupling portion of the portable terminal of FIG. 14.

Referring to FIGS. 14 and 15, a portable terminal of having a camera module protection structure according to various embodiments of the present disclosure may include: a battery cover 90; a rear housing or case 70; a main PCB 80; a rigid PCB 40 to which a camera module 10 is mounted; a display bracket 82; and a display 84.

The shield can 45 covers at least a part of the electronic components 41. The shield can 45 may be located in the second area 200 corresponding to a fixing maintaining component mounting area to which components OIS functions is mounted.

An adhesive or a tape 48 may be interposed between the main PCB 80 and an upper portion of the shield can 45.

An optical elasticity resin or an optical transparent tape may be used as the adhesive.

When a sufficient space does not exist between the main PCB 80 and the upper portion of the shield can 45, a separate adhesive or the tape 48 may be used between the main PCB 80 and the shield can 45. A structure in which the main PCB 80 approaches the shield can 45 to be directly in contact with the shield can 45 may be included.

A location of the shield can 45 along the Z axis can be fixed as the shield can 45 is vertically pressed and fixed by the main PCB 80 and the rigid PCB 40.

In this way, as the shield can 45, which covers at least a part of the electronic components 41 of the second area 200, is vertically pressed and fixed by the PCBs 40 and 80, the strength thereof can be reinforced by applying the slit 42 by maximally expanding the area of the shield can 45.

Figure 10:
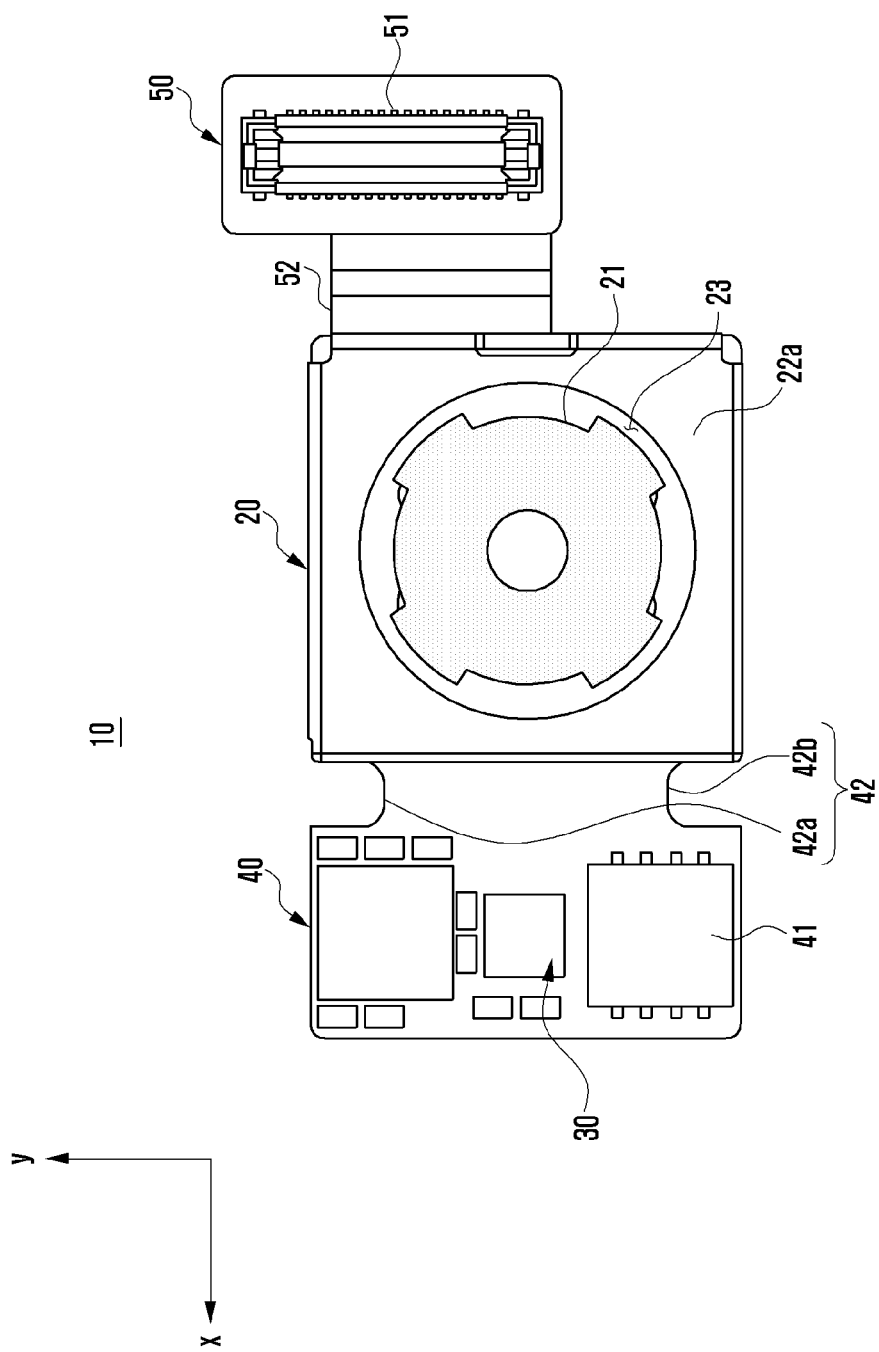
FIG. 10 is a plan view illustrating a configuration of an electronic device having a camera module protection structure according to another embodiment of the present disclosure.

FIG. 10 is a plan view illustrating a configuration of an electronic device having a camera module protection structure according to another embodiment of the present invention.

As illustrated in FIG. 10, dissimilar to the above embodiment in which the section area of the FPCB 52 for assembling the connector part 50 to the second area 200 of the PCB 40. The section area of the FPCB 52 can be connected to the other side of the PCB 40, i.e. the first area 100.

Although not illustrated in detail, the connector part 50 may be connected to any surface of remaining surfaces except for one surface on which the second area 200 is located from among four surfaces of the camera module 10 mounted to the first area 100.

The connector part 50 may prevent a location is an OIS component from being twisted as the previously-fixed second area 200 is pulled or twisted by the FPCB 52, when the camera module 10 is located in the mechanism and the connector 51 is connected to the PCB 40 for electrical connection.

Figure 11:
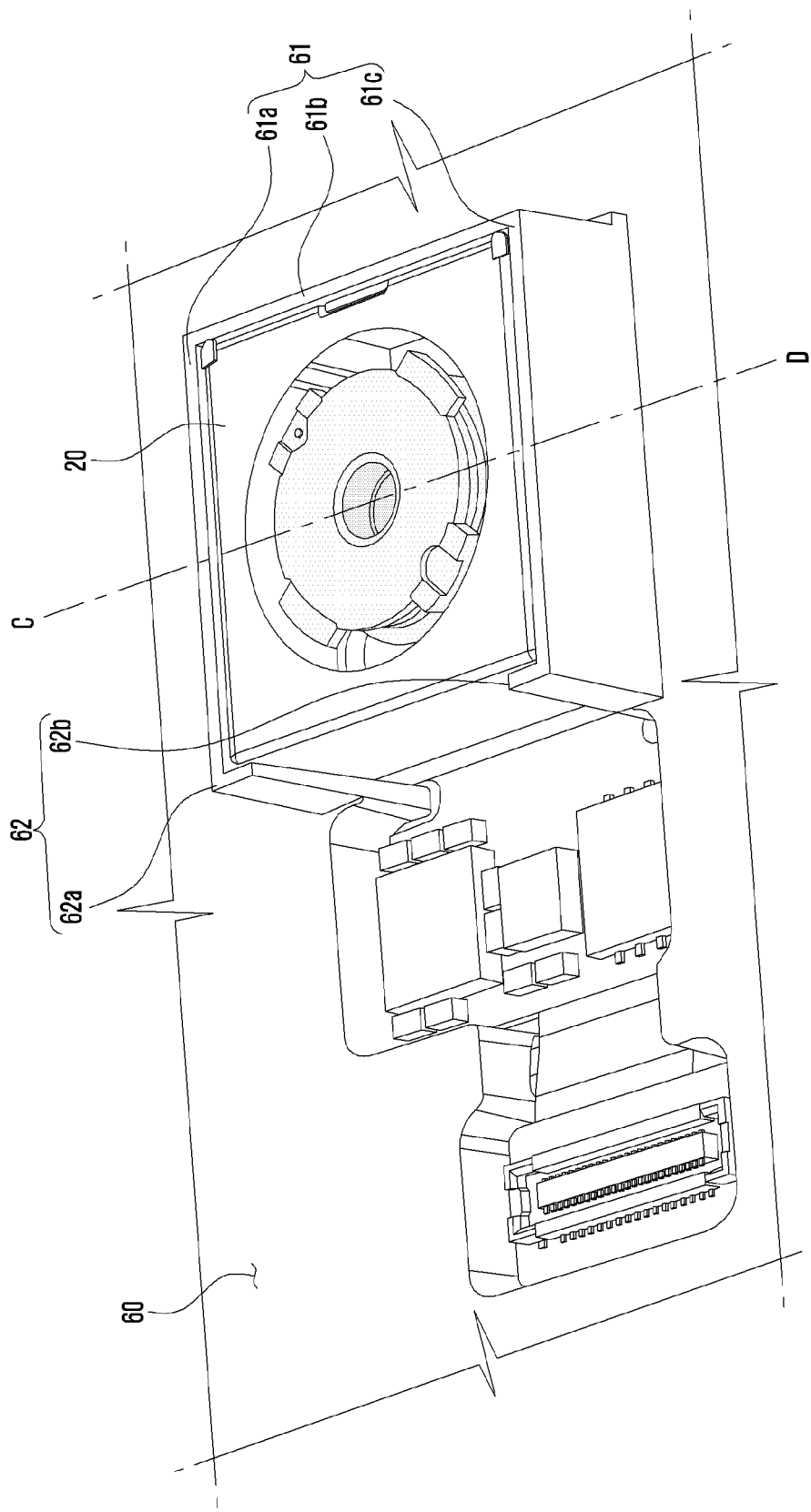
FIG. 11 is a partial perspective view illustrating a camera module protection structure of an electronic device according to various embodiments of the present disclosure.
Figure 12:
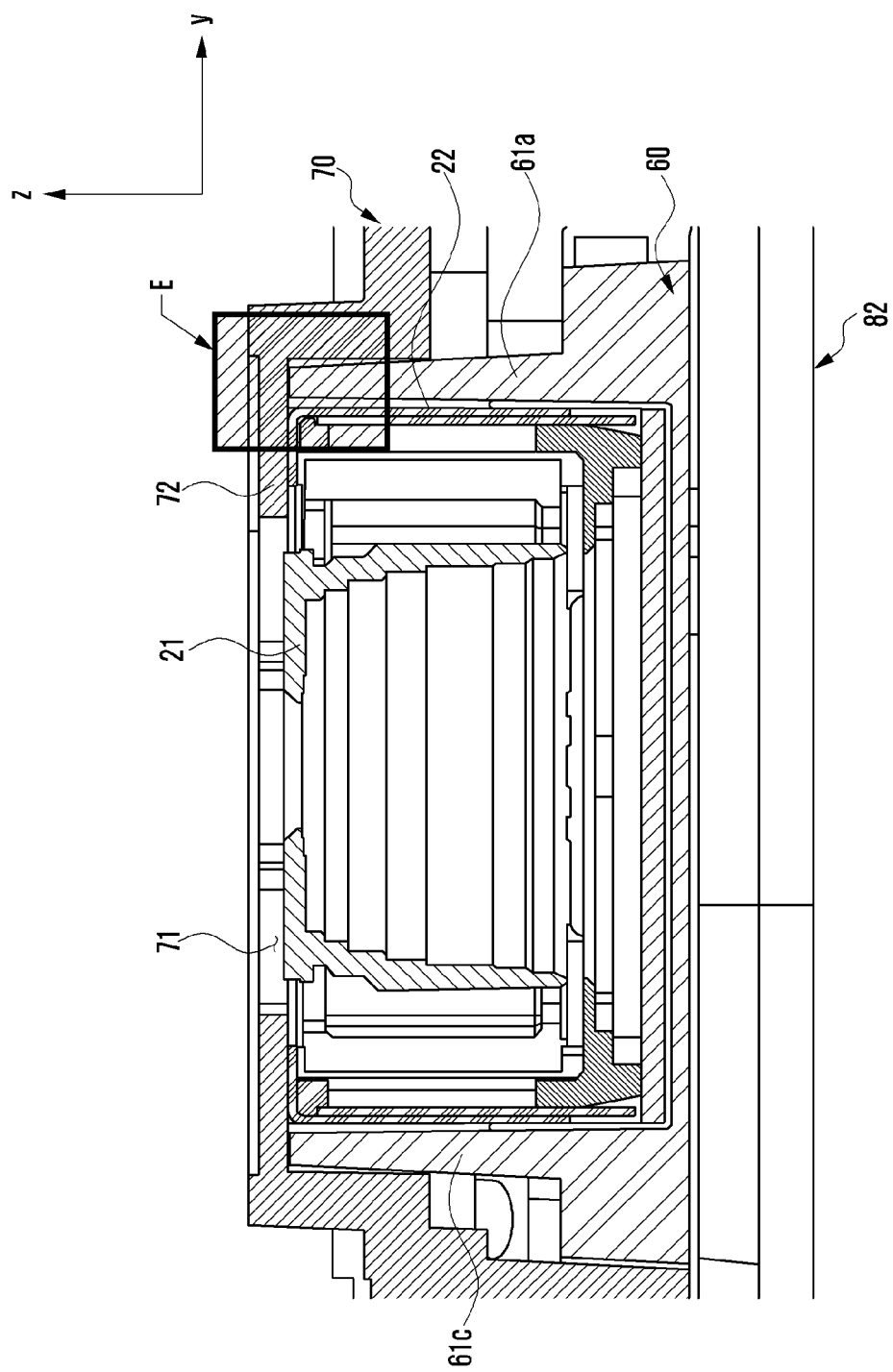
FIG. 12 is a sectional view taken along line C-D of FIG. 11.
Figure 13:
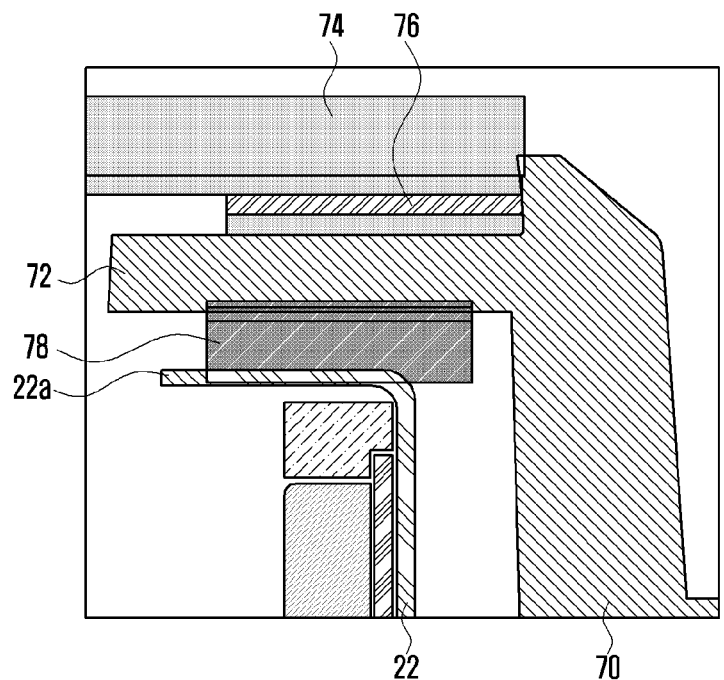
FIG. 13 is a detailed view illustrating an "E" part of FIG. 12.

FIG. 11 illustrates a camera module protection structure of an electronic device according to various embodiments of the present disclosure. FIG. 12 is a sectional view taken along line C-D of FIG. 12, which illustrates a coupling state with an engagement component on a set by a guide rib applied to a seating part of the camera module. FIG. 13 illustrates an "E" part of FIG. 12.

Referring to FIGS. 11 to 13, in the camera module protection structure of the electronic device 1 according to various embodiments of the present disclosure, a guide rib housing 60 surrounding at least a part of the first area 100 of the PCB 40 including the lens module 20 may be applied.

The guide rib housing 60 may include first guide ribs 61 surrounding three surfaces, e.g. an upper side, a lower side, and a right side of the lens module 20 (with respect to the drawing). The guide rib housing 60 may include a left second guide rib protruding to the slit 42 formed on the third area 300 of the rigid PCB 40.

In this way, the guide rib housing 60 may minimize the eccentricity generated during assembly as the four surfaces of the lens module 20 are surrounded and supported by the first guide rib 61 including an upper guide rib 61a, a right guide rib 61b, and a lower guide rib 61c, and the second guide rib 62. In this way, the guide rib housing 60 simultaneously improves the quality of an outer appearance and reinforces the strength of an engagement mechanism.

The second guide rib 62 may have a part of guide ribs 62a and 62b protruding from the first slit 42a and the second slit 42b of the slit 42, respectively. Likewise, when the slit 42 is formed at only one of an upper side and a lower side, the second guide rib 62 may have one guide rib protruding from only the formed silt.

Further, the lens module 20 may seated between the rear case 70 and the guide rib housing 60. The rear case 70 may include a case hole 71 corresponding to the lens hole 23 of the lens module 20. A case cover 72 may be seated on the upper surface 22a of the lens housing 22 and the first guide rib 61.

A camera window 74 may be attached to an upper surface of the case cover by a double-sided tape 76.

At this time, the first guide rib 61 and the second guide rib 62 of the guide rib housing 60 can be in contact with a lower surface of the case cover 72. An elastic member such as a sponge 78 may be inserted between the upper surface 22a of the lens housing 22 and the case cover 72, thereby preventing a shock from being transferred to the lens module 20.

In this way, the guide rib housing 60 surrounding the lens module 20 may prevent a shock from being directly transferred to the lens module 20 while supporting the engagement component, i.e. the rear case 70.

As described above, the electronic device according to an embodiment of the present invention further includes a guide rib structure by applying a minimum slit shape to one direction or upper and lower directions, i.e. two directions, so that a section of the rigid PCB of the mounting area of the OIS camera component is not deformed. At the same time, the eccentric problem is solved which is generated during assembling by the guide rib housing, so that the quality of an outer appearance can be improved and a shock can be prevented from being transferred to the camera module, due to the strength reinforcement with the engagement mechanism.

Further, the electronic device according to an embodiment of the present invention can solve the eccentric problem generated during assembling by the guide rib structure, so as to improve the quality of an outer appearance and reinforce the strength with the engagement mechanism, thereby preventing a shock from being transferred to the lens module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device having a camera module, the electronic device comprising:
    a Printed Circuit Board (PCB) located on a surface of the camera module;
    a lens module mounted on a first area of the PCB;
    a guide rib housing surrounding at least a peripheral part of the first area;
    fixing maintaining components mounted on a second area of the PCB; and
    a third area located between the first area and the second area, and having at least one opening,
    wherein the guide rib housing comprises a first rib surrounding three surfaces of the lens module and a second guide rib protruding to the opening formed on the PCB of the third area,
    wherein the lens module is mounted between a rear case and the guide rib housing, the rear case including a case hole corresponding to a lens hole of the lens module and a case cover mounted on an upper surface of a lens housing of the lens module and the first guide rib.

2. The electronic device of claim 1, wherein the PCB is a rigid PCB.

3. The electronic device of claim 1, wherein the fixing maintaining components have an OIS function, and comprise an angular velocity sensor and an electronic component located near the angular velocity sensor.

4. The electronic device of claim 3, wherein the second area further comprises a shield can configured to cover at least a part of electronic components, and wherein the shield comprises an expanded area.

5. The electronic device of claim 4, further comprising a main PCB, and wherein the shield can is pressed and fixed between the main PCB and the PCB.

6. The electronic device of claim 5, further comprising at least one of an adhesive and an elastic member between the shield can and the main PCB.

7. The electronic device of claim 1, wherein the opening in the third area between the first area and the second area comprises a slit.

8. The electronic device of claim 7, wherein the slit comprises at least one slit formed on at least one of an upper side and a lower side of the third area.

9. The electronic device of claim 1, further comprising a Flexible PCB (FPCB) configured to assemble a connect part, and wherein a section area of the FPCB is connected to at least one of the first area and the second area of the PCB.

10. The electronic device of claim 1, further comprising a metal-made reinforcement plate formed on a rear surface of the PCB.

11. The electronic device of claim 10, further comprising at least one slit formed on at least one of an upper side and a lower side of the metal-made reinforcement plate.

12. The electronic device of claim 10, wherein the guide rib is in contact with the case cover and further comprises an elastic member located between the case cover and the lens module.

* * * * *